Oct. 27, 1925.
M. J. SCHAMERLOH
FISH LINE BOBBER
Filed July 16, 1923
1,558,928
Fig. 1.
Fig. 2.
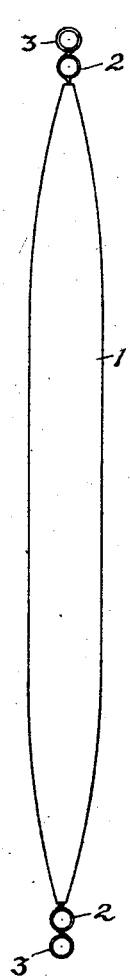
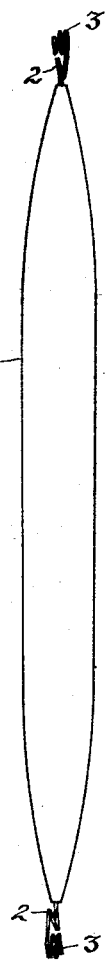
Martin J. Schamerloh, INVENTOR
BY
A. H. Burns ATTORNEY Patented Oct. 27, 1925.

1,558,928

UNITED STATES PATENT OFFICE.

MARTIN J. SCHAMERLOH, OF FORT WAYNE, INDIANA.

FISHLINE BOBBER.

Application filed July 16, 1923. Serial No. 651,688.

*To all whom it may concern:*

Be it known that I, MARTIN J. SCHAMERLOH, a citizen of the United States of America, and resident of Fort Wayne, in the county of Allen and State of Indiana, have invented certain new and useful Improvements in Fishline Bobbers, of which the following is a specification.

This invention relates to improvements in fish line bobbers and the object thereof is to provide a bobber with means for quickly securing it upon a fish line in a manner that will admit of the bobber being readily adjusted to various positions on the line for fishing at different depths by merely pulling the bobber up and down to the extent desired. Another object is to construct the fastening means so that when the bobber is attached to the line it will be frictionally sustained in adjusted positions thereon.

These objects are accomplished by the construction illustrated in the accompanying drawings, in which:—

Fig. 1 is an elevation of a bobber embodying the invention; and

Fig. 2 is a similar view projected from Fig. 1 in a plane at right angles thereto.

The characters appearing in the description refer to parts shown in the drawings and designated thereon by corresponding characters.

The invention consists of a float 1 which may be made of any suitable buoyant material and shaped as desired, and provided at each of its ends with a line fastening device comprising two connected wire coils 2 and 3 respectively disposed in tandem fashion with their axes in parallel relation with each other, said coils being wound respectively in opposite directions. The coil 2 has only a single turn, while the coil 3 has a series of turns.

In utilizing the invention the fish line is threaded successively through the various coils so as to pass through the coils of each fastener in opposite directions. Or, by manipulating the line it may be drawn between the turns of the coils successively so as to extend therethrough. When the line is drawn taut, movement of the bobber on the line will be resisted owing to the bends in the line where it passes through the successive coils; and when the line is slack, the line may be drawn with more or less freedom through the coils so as to effect adjustments of the bobber thereon.

The bobber may be disconnected from the line by manipulating the line successively between the turns of each coil in the opposite manner in which it was introduced into the coils when applying the bobber to the line.

What I claim is:—

In a device of the class described, a float and a pair of line fasteners, one at each end of the float, and each consisting of a wire secured in and extending from the corresponding end of the float, the extending portion of the wire having formed therein a pair of connected coils arranged in tandem fashion with the axes thereof in parallel relation with each other, the coil adjacent the float having a single turn and the other coil having a series of turns.

In testimony whereof I affix my signature.

MARTIN J. SCHAMERLOH.